(12) United States Patent
Jakubowski (10) Patent No.: US 9,294,549 B2
(45) Date of Patent: Mar. 22, 2016

(54) CLIENT BANDWIDTH EMULATION IN HOSTED SERVICES

(75) Inventor: Robert Jakubowski, Coconut Creek, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 225 days.

(21) Appl. No.: 13/372,705

(22) Filed: Feb. 14, 2012

(65) Prior Publication Data

US 2013/0212288 A1 Aug. 15, 2013

(51) Int. Cl.
| | |
|---|---|
| G06F 15/16 | (2006.01) |
| H04L 29/08 | (2006.01) |
| H04L 29/06 | (2006.01) |
| H04W 28/20 | (2009.01) |
| H04L 12/24 | (2006.01) |
| H04W 4/00 | (2009.01) |

(52) U.S. Cl.
CPC ............ *H04L 67/08* (2013.01); *H04L 41/0896* (2013.01); *H04L 63/0272* (2013.01); *H04W 4/003* (2013.01); *H04W 28/20* (2013.01)

(58) Field of Classification Search
USPC ........................................................ 709/228
See application file for complete search history.

(56) References Cited

U.S. PATENT DOCUMENTS

| | | | |
|---|---|---|---|
| 2002/0059517 A1 | 5/2002 | Haviv et al. | |
| 2004/0252698 A1* | 12/2004 | Anschutz et al. | ........ 370/395.21 |
| 2005/0132068 A1* | 6/2005 | Rajamony | .................... 709/228 |
| 2006/0075105 A1* | 4/2006 | Momtchilov et al. | ......... 709/227 |
| 2006/0075123 A1* | 4/2006 | Burr et al. | ..................... 709/228 |
| 2007/0097130 A1 | 5/2007 | Margulis | |
| 2007/0130306 A1* | 6/2007 | Ofel | ............................. 709/223 |
| 2008/0222021 A1* | 9/2008 | Stanforth et al. | ............... 705/37 |
| 2012/0185563 A1* | 7/2012 | Sugiyama et al. | ............ 709/217 |
| 2013/0160128 A1* | 6/2013 | Dolan-Gavitt et al. | ......... 726/25 |

OTHER PUBLICATIONS

May 23, 2013 International Search Report and Written Opinion issued in International Application No. PCT/US2013/0258515.
Bill Birney, "Intelligent Streaming", May 2003, 6 pages.
Cloudstack, "8.3. Network Throttling," 2 pages,https://cloudstack.apache.org/docs/en-US/Apache_CloudStack/4.1.1/html/Admin_Guide/network-rate.html, retrieved Mar. 26, 2014.
Microsoft, "Bit Rate Throttling," 3 pages, http://www.iis.net/downloads/microsoft/bit-rate-throttling, retrieved Mar. 26, 2014.

(Continued)

*Primary Examiner* — Richard G Keehn
(74) *Attorney, Agent, or Firm* — Banner & Witcoff, Ltd.

(57) ABSTRACT

Bandwidth on the Internet and intranets is highly variable and unreliable, two properties that can make streaming digital media content difficult. In a virtualization system (e.g., virtual desktop, remote desktop, remote application, and the like), this is especially so based on different bandwidths available to the session host and the session client. Methods and systems for emulating a bandwidth of a client device in a virtualization system are described. When the session host is executing an application (e.g., a digital media application), the session host may emulate the bandwidth of the session client by hooking into and throttling data over one or more APIs associated with the digital media application, thereby tricking the application into making a bandwidth determination based on the emulated bandwidth of the session client, rather than based on the bandwidth of the session host.

20 Claims, 5 Drawing Sheets

(56) References Cited

OTHER PUBLICATIONS

Phonescoop, "Bandwidth Throttling," 1 pages, (Copyright 2014), http://www.phonescoop.com/glossary/term.php?gid=491, retrieved Mar. 26, 2014.

SearchNetworking, "Throttled Data Transfer," 1 page, (Jul. 26, 2010), http://searchnetworking.techtarget.com/definition/throttled-data-transfer, retrieved Mar. 26, 2014.

Wikipedia, "Bandwidth Throttling," 8 pages, (Jan. 11, 2014), http://en.wikipedia.org/wiki/Bandwidth_throttling, retrieved Mar. 26, 2014.

* cited by examiner

CLIENT BANDWIDTH EMULATION IN HOSTED SERVICES

FIELD

Aspects described herein relate to computer systems, computer networks, and virtualization of computer services. More specifically, aspects described herein relate to the optimization of services provided over a virtualization session based on available bandwidth between a session host and a session client.

BACKGROUND

Traditionally, personal computers include combinations of operating systems, applications, and user settings, each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

A virtual desktop might still require a client application (e.g., a thin client) executing on a client device to execute or perform various tasks. The client, in turn, may be constrained by an available network bandwidth between the client device and one or more networks on which the client device relies for network and/or Internet access.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe new methods and systems of optimizing client device performance for hosted services based on the network bandwidth available to the client device. Bandwidth on the Internet and intranets is highly variable and unreliable, two properties that can make streaming digital media content difficult. In a virtualization system (e.g., virtual desktop, remote desktop, remote application, and the like), this is especially so based on different bandwidths available to the session host and the session client (e.g., session hosts regularly have higher available bandwidths than session clients). Methods and systems for emulating a bandwidth of a client device in a virtualization system are described herein.

According to some aspects, when a session host is executing an application (e.g., a digital media application), the session host may emulate the bandwidth of the session client by hooking into and throttling data over one or more APIs associated with the digital media application, thereby tricking the application into making a bandwidth determination based on the emulated bandwidth of the session client, rather than based on the actual bandwidth of the session host.

According to another aspect, methods and systems hook into (e.g., intercept) an application programming interface (API) on a session host in a virtualization system. The hook may be within a virtual desktop, and may further be only with respect to one or more particular processes executing within that virtual desktop. When the API is called, the session host (or virtual desktop) may intercept the API call, and return data to the API based on a bandwidth of a session client connected with the session host (e.g., the session client connected to that particular virtual desktop).

According to some aspects, the API is determined by querying a database for a process name associated with a first application executing on the session host or executing within the virtual desktop. The API might be hooked only within the particular process, such that when the API is called by a second application executing on the session host, the API is executed without interception by the hook. The data returned to the hooked API may be same data as otherwise would be returned, however, the data may be throttled based on the bandwidth of the session client. The application may then perform a first action based on an analysis of the data returned via the API, e.g., selecting a particular bitrate for a video or digital media stream.

BRIEF DESCRIPTION OF THE DRAWINGS

Having thus described aspects of the disclosure in general terms, reference will now be made to the accompanying drawings, which are not necessarily drawn to scale, and wherein:

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
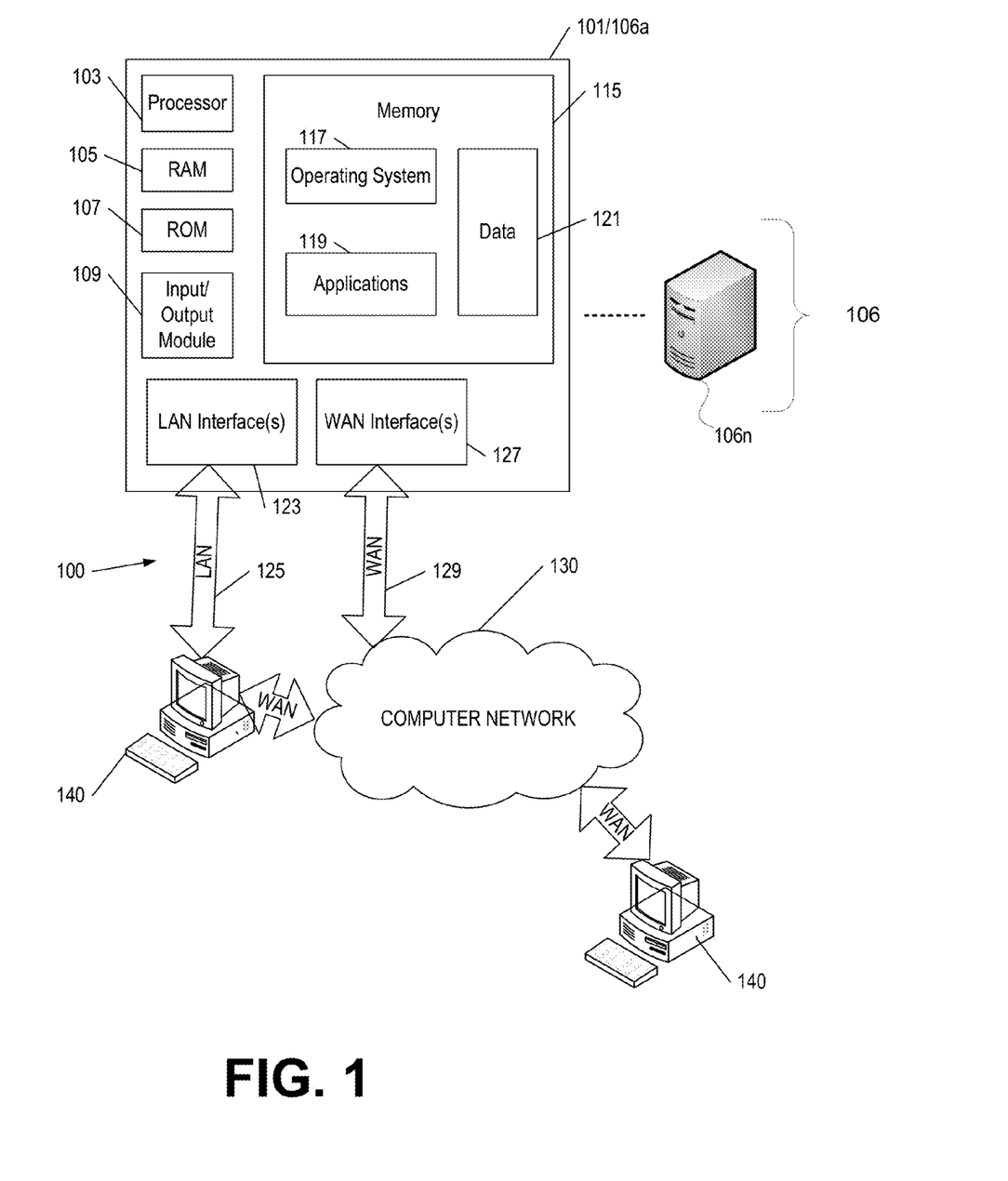
FIG. 1 illustrates an example operating environment in which various aspects of the disclosure may be implemented.

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in particular aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications (e.g., such as for an on-line video game); a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, SAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., Windows Server, manufactured by Microsoft Corp. of Redmond, Wash., UNIX, LINUX, iOS, or LION, etc.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like XENAPP, XENDESKTOP, METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node configured to communicate with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
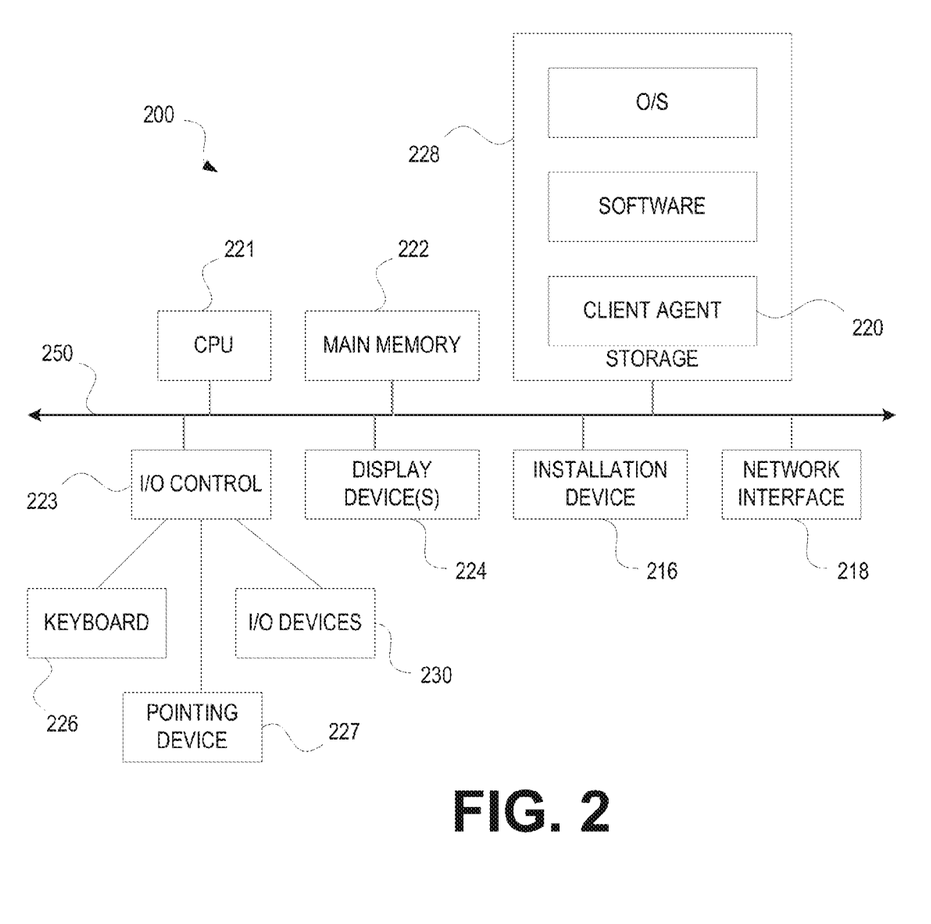
FIG. 2 illustrates a client device that may be used in accordance with one or more illustrative aspects described herein.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230.

Figure 3:
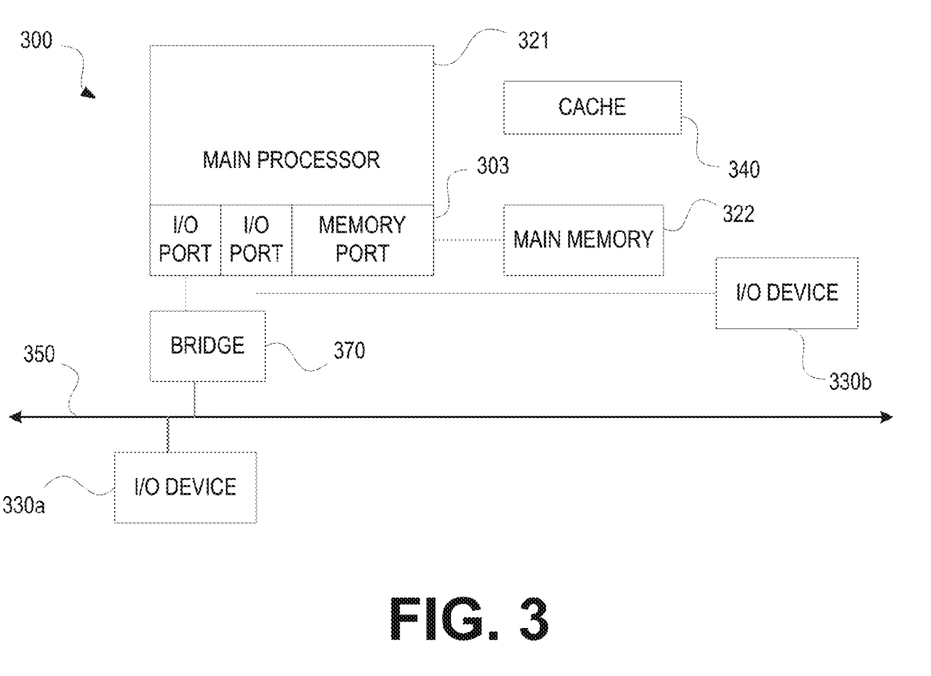
FIG. 3 illustrates a client device that may be used in accordance with one or more illustrative aspects described herein.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; or any combination of a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330. In some embodiments, the local system bus 350 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 300 include an I/O device 330 that includes a video display 224 that communicates with the central processing unit 321. Still other versions of the computing machine 300 include a processor 321 connected to an I/O device 330 via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' (not shown) via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, e.g., any WINDOWS-based, Unix, Linux, MacOS, iOS, OS/2, PalmOS, Android, Symbian, or any other embedded operating system, real-time operating system, open source operating system, proprietary operating system, operating systems for mobile computing devices, or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device, smartphone, personal digital assistant, or the like. Any computing device regardless of different platforms, processors, operating systems, and input devices may be used that is capable of performing the methods and systems described herein.

Moreover, the computing device 200 can be any workstation, desktop computer, laptop or notebook computer, server, handheld computer, mobile telephone, digital audio player (iPod, iPhone, Zune, RAZR, ROKR, etc.), any other computer, or other form of computing or telecommunications device that is capable of communication and that has sufficient processor power and memory capacity to perform the operations described herein.

FIGS. 1-3 show a high-level architecture of illustrative virtualization systems. As shown, the desktop virtualization system may be single-server or multi-server system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Having described in FIGS. 1-3 various examples of virtualization systems, and certain software and functionality that may be included in such systems, it will be appreciated that other software and hardware may be used other than those which are identified above. In addition, the following paragraphs provide additional examples of various methods and systems relating to optimizing hosted services based on the available bandwidth between a session host and a session client.

Figure 4:
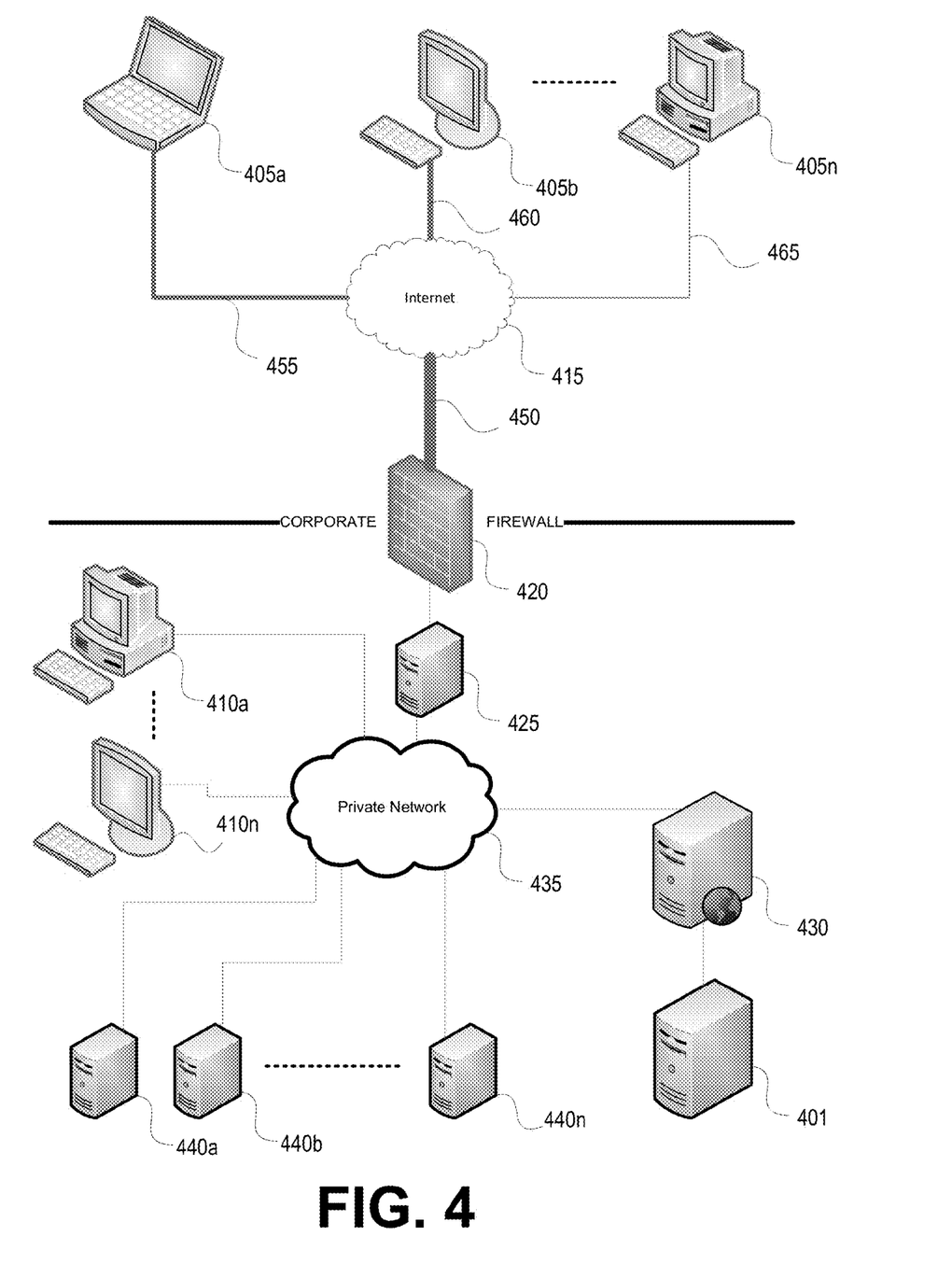
FIG. 4 illustrates a system architecture in accordance with one or more illustrative aspects described herein.

With reference to FIG. 4, one or more external client devices 405*a*-405*n* may communicate with a connection broker 430 via one or more networks 415, 435. Network 415 may include a public network such as the Internet. Network 435 may include a private network such as a corporate LAN, WAN or the like, protected by firewall 420. Any other networks may also be used.

External client device 405 may communicate through firewall 420 via an edge device 425, such as an access gateway, virtual private network (VPN) server, or the like. Web server 430 may include an externally facing aspect and an internally facing aspect for communicating with external client devices 405 and internal client devices 410, respectively. Alternatively, a single logical web server may be adapted or configured to communicate with all client devices. Web server 430 communicates with connection broker 401 to handle requests for sessions with virtualized resources, as further described herein. In some aspects web server 430 and connection broker 401 are physically and/or logically separate devices. In other aspects web server 430 and connection broker 401 may be physically and/or logically combined.

Connection broker 401 may receive login credentials from users at client devices 405, 410 (e.g., via a web server 430 or other client-server configuration), and then create and/or assign resources to authorized users, and provide management consoles to authorized administrators. Each resource, e.g., a hosted application, hosted resource, virtual machine, or the like, may be hosted by one or more session hosts 440*a*-440*n* (e.g., device 101, 106).

When a session host for a hosted desktop or hosted application has high network bandwidth, and the session client has lower available bandwidth, problems may arise when the session host performs some action on behalf of the session client based on the higher bandwidth available to the session host rather than the lower bandwidth available to the session client. FIG. 4 illustrates session hosts 440*a*-440*n* having high Internet bandwidth/pipe 450, illustrated by a thick line. Session clients 405*a*-405*n* may have varying levels of bandwidth 455-465, illustrated by lines of varying thickness. Session clients 410*a*-410*a*, which in this example are located behind corporate firewall 420, may have the same Internet bandwidth 450 as session hosts 440*a*-440*n*. That is, corporate network 435 may be limited in bandwidth by connection 450 outside the corporate firewall 420, but otherwise have Fast Ethernet or Gigabit Ethernet speeds, e.g., 100 Mbits/s, Gigabit/s or faster.

In one example, web-based video content (on demand or real-time) may be encoded into multiple files or streams using different bitrates (e.g., multiple H.264 streams) so that a recipient of the video can select the optimal bitrate based on the network bandwidth available to the recipient. When the virtual desktop (session host) has high bandwidth, a bandwidth adaptive video player application running on the virtual desktop might fetch a high bitrate video based on the virtual desktop's available bandwidth 450. However, that bitrate might not be appropriate (for instance, the video might have to be transcoded) if the client-side bandwidth 465 where the video will be decoded and rendered is low. Stated differently, the transcoding of video may occur at the session client device, despite being initially requested by the host device. In addition, the session host device may select a particular bitrate data stream to download based on the bandwidth determined to be available at the session host, rather than based on the bandwidth of the session client that will actually be performing the transcoding. The session client may thus suffer performance issues when constrained by the client's available bandwidth versus the bitrate of the incoming video stream. Similar problems may arise when a session host is running other data-intensive applications on behalf of the session client.

There is presently no standard application programming interface (API) or methodology used to determine bandwidth. Each application typically uses its own set of APIs or techniques to determine bandwidth. Video applications in particular, e.g., Windows Media Player by Microsoft Corporation of Redmond, Wash., may independently determine bandwidth and dynamically alter the bitrate of a video stream based on the currently available bandwidth. Windows Media Player refers to this as Intelligent Streaming. Other video players or other high-bandwidth applications may use other techniques to determine bandwidth.

According to one aspect, database 121 may store information regarding APIs that each application uses to determine bandwidth. For example, application A might use APIs X and Y to determine bandwidth, e.g., by sending or receiving some known quantity of data via those APIs and measuring the amount of time taken to send or receive the known quantity of data. Application B might use API Z to perform a similar calculation. By using one or more APIs, applications executing on the session host (or within a particular virtual desktop) determine the session host's bandwidth and make any subsequent decisions (e.g., a selection of which bitrate video stream to choose) based on the host device's bandwidth. However, the bandwidth available to the session client may present a subsequent, unaccounted for bottleneck. Thus, according to an illustrative embodiment, the session host (or the virtual desktop) may be configured to emulate the client device's network bandwidth by hooking in to one or more API(s) identified in database 121 and throttling bandwidth based on the bandwidth of the client device. Hooking and throttling may be performed system-wide or on a per-process basis.

Figure 5:
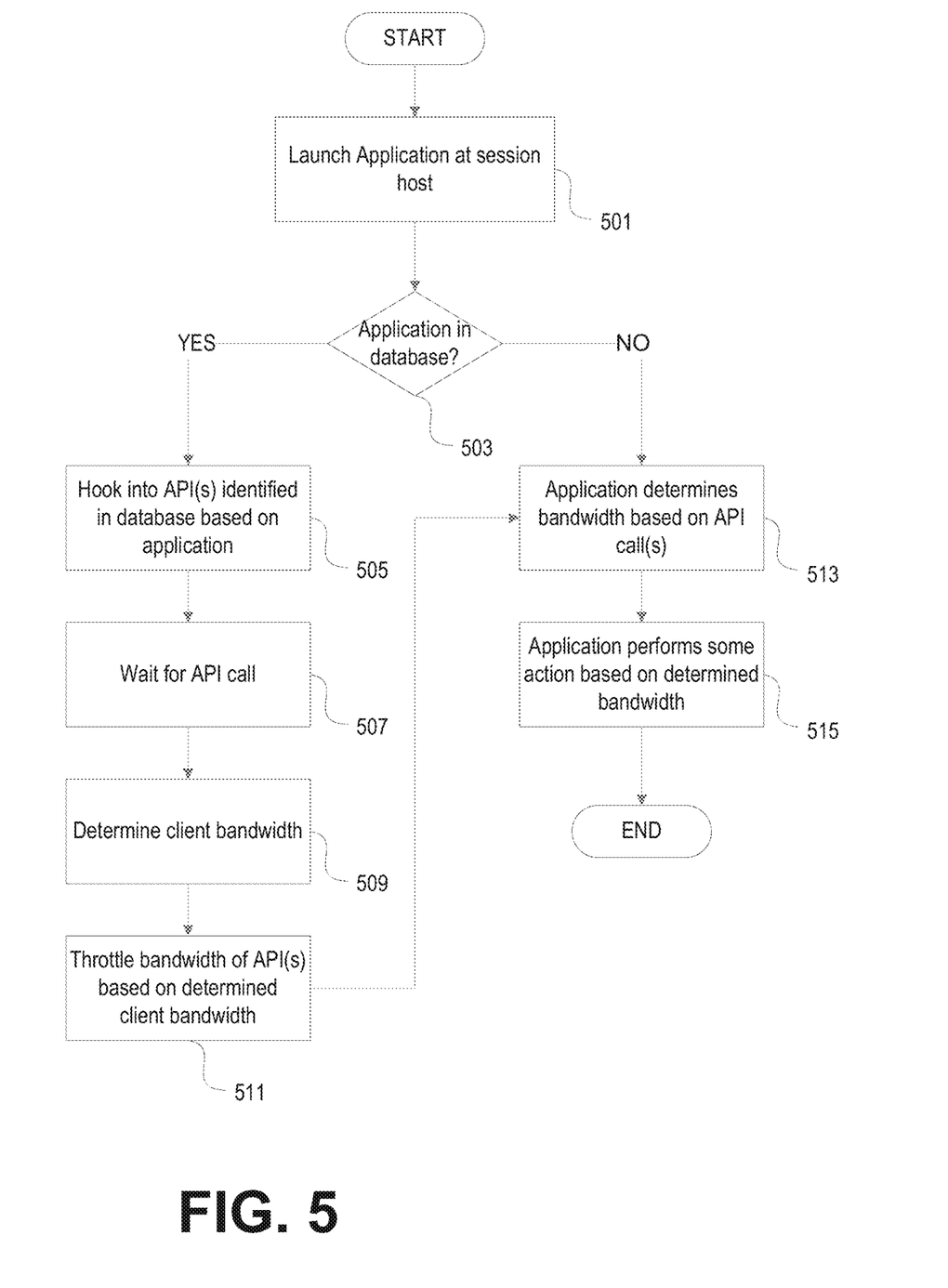
FIG. 5 shows an illustrative flowchart for a method of emulating bandwidth according to one or more aspects described herein.

With reference to FIG. 5, an illustrative method for emulating a client device's bandwidth is provided. Initially, in step 501, an application is launched within the hosted session, e.g., a video player application may be launched based on user input or automatically based on the occurrence of some event or selection of an Internet link. In step 503, the session host queries database 121 based on the process name of the application. If the process name is not in database 121, then no hooks are created or established for any given APIs within that process, and the method skips to step 513. A hook, as used herein, refers to the practice of intercepting an API call and returning a value other than from the originally called API.

If, in step 503, the query returns one or more known API(s) that the application uses to determine bandwidth, then the session host in step 505 creates new hooks for the identified APIs to intercept calls to those APIs. Session host may create the hook on a per-process basis, thereby intercepting API calls only from the launched application, while allowing other processes to still access the APIs unhindered. Alternatively, the hooks may be established on a system-wide basis.

In step 507 the session host waits for the launched application to call one or more of the identified APIs. In step 509, when one or more of the identified APIs are called, the session host checks, queries, or otherwise determines the current bandwidth of the session client device. There are various ways to determine the client device bandwidth, and the particular method used is secondary to the ability to determine the bandwidth. Stated differently, how the client device's bandwidth is determined does not matter, provided that there is some method or mechanism that can estimate or determine the client device's bandwidth. In one example, the client/server software executing the virtual desktop may include a software component or module that determines a current bandwidth between the session host and session client. In another example, session host may maintain a known or estimated bandwidth determine when the session was initially established between the session host and session client. In another example, the session host may query the session client, and the session client may in turn execute a bandwidth determination process, e.g., using any number of publicly available or accessible Internet bandwidth determination web sites or tools, etc.

Regardless of how the client bandwidth is determined, the session host in step 511 artificially throttles the bandwidth of one or more of the identified APIs based on the determined bandwidth of the session client, thereby emulating the bandwidth of the session client. Next, in step 513, the launched application makes a bandwidth determination based on the information/data returned from the API(s). If the API(s) are hooked in step 505, then the information/data returned by the API(s) is the result of the artificial throttling that occurred in step 511. The launched application will therefore determine the bandwidth to be consistent with the emulated bandwidth of the client device. However, if the APIs were not hooked (because the launched application was not included in database 121), then the launched application makes a truly independent bandwidth determination because the information/data returned from the API(s) is not based on artificially throttling to emulate the client bandwidth. Lastly, in step 515, the launched application makes a decision, executes an event, selects an input or output, or otherwise performs some action based on the determined bandwidth.

The method illustrated in FIG. 5 may be altered without departing from the spirit or scope of the inventions described herein. For example, steps may be modified, combined, or split into further sub-steps, and may be performed in other than the recited order based on system design.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:
hooking an application programming interface (API) on a session host in a virtualization system;
determining a client bandwidth of a session client connected to the session host;
when the API is called by a first application executing on the session host:
intercepting the API call based on the hook;
throttling a bandwidth of the API based on the determined client bandwidth and maintaining a bandwidth of another API associated with a different application on the session host; and
returning data to the first application based on the throttled bandwidth of the API; and
determining, by the first application, an available bandwidth based on analyzing the data returned by the API.

2. The method of claim 1, further comprising:
determining the API by querying a database for a process name associated with the first application.

3. The method of claim 2, further comprising:
hooking the API within the process associated with the first application; and
when the API is called by a second application executing on the session host, executing the API without interception by the hook.

4. The method of claim 1, further comprising the first application selecting a video stream based on the data returned via the API.

5. The method of claim 1, wherein determining the client bandwidth is based on a data rate of communications between the session client and the session host.

6. The method of claim 1, wherein determining the client bandwidth is based on an estimated client bandwidth maintained by the session host.

7. The method of claim 1, wherein determining the client bandwidth is based on communications between the session client and a bandwidth estimation web site accessible by the session client over the Internet.

8. One or more non-transitory computer readable media comprising computer readable instructions that, when executed, emulate a client bandwidth in a virtual desktop session by:
determining an application programming interface (API) associated with a first application executing on a session host of the virtual desktop session;
hooking (the API) by the session host;

in response to a call to the API by a first application executing on the session host:
  intercepting the API call based on the hook;
  throttling, via the hook, a bandwidth of the API based on a determined client bandwidth of a session client connected to the session host; and
  returning data by the API based on the throttled bandwidth of the API; and
determining, by the first application, an available bandwidth based on the data returned by the API.

9. The computer readable media of claim 8, wherein determining the API associated with the first application comprises:
  determining the API by querying a database for a process name associated with the first application.

10. The computer readable media of claim 9, said emulating the client bandwidth further comprising:
  hooking the API within the process associated with the first application; and
  when the API is called by a second application executing on the session host, executing the API without interception by the hook.

11. The computer readable media of claim 8, said emulating the client bandwidth further comprising:
  determining the client bandwidth of the session client, wherein the client bandwidth is a current bandwidth between the session host and the session client.

12. The computer readable media of claim 8, said emulating the client bandwidth further comprising the first application selecting a video stream based on the data returned via the API.

13. A session host apparatus comprising:
a processor; and
memory storing computer readable instructions that, when executed by the processor, cause the session host apparatus to emulate a client bandwidth within a virtual desktop session associated with a session client to:
  hook an application programming interface (API) associated with a first application executing within the virtual desktop session;
  when the API is called by the first application;
    intercept the API call based on the hook;
    determine a client bandwidth of the session client connected to the virtual desktop; and
    return data via the API based on the determined client bandwidth; and
  determine, via the first application, an available bandwidth based on an analysis of the data returned via the API.

14. The session host apparatus of claim 13, said emulating the client bandwidth further comprising:
  determining the API by querying a database stored in the memory for a process name associated with the first application,
  wherein the API is called by the first application.

15. The session host apparatus of claim 14, said emulating the client bandwidth further comprising:
  hooking the API within the process associated with the first application; and
  when the API is called by a second application executing within the virtual desktop, executing the API without interception by the hook.

16. The session host apparatus of claim 13, wherein returning data to the API based on the bandwidth of the session client comprises throttling a data bandwidth of the API based on the bandwidth of the session client.

17. The session host apparatus of claim 13, said emulating the client bandwidth further comprising:
  the first application performing a first action based on the analysis of the data returned via the API.

18. The session host apparatus of claim 13, said emulating the client bandwidth further comprising the first application selecting a video stream based on the data returned via the API.

19. A method comprising:
  at a host device, establishing a virtual desktop session between a client device and the host device;
  hooking an application programming interface (API) associated with an application executing in the virtual desktop session;
  receiving, by the application, a request from the client device for a first video stream;
  calling, by the application, the application programming interface (API);
  in response to the call to the API;
    determining a client bandwidth of the client device based on communications between the host device and the client device; and
    returning data to the application based on the determined client bandwidth;
  determining, by the application, an available bandwidth based on the data returned from the API; and
  retrieving, by the application, the first video stream at a bitrate selected based on the determined available bandwidth.

20. The method of claim 19, wherein determining the client bandwidth comprises determining a current bandwidth between the host device and the client device.

* * * * *